United States Patent [19]

Wisseroth

[11] 3,870,693
[45] Mar. 11, 1975

[54] HOMOPOLYMERIZATION OR COPOLYMERIZATION OF ETHYLENE

[76] Inventor: Karl Wisseroth, 80 Wittelsbachstrasse, 6700 Ludwigshafen, Germany

[22] Filed: Jan. 26, 1972

[21] Appl. No.: 221,029

[52] U.S. Cl............ 260/94.9 D, 252/458, 252/465, 260/80, 260/78, 260/88.2 R
[51] Int. Cl. ............................................... C08f 1/66
[58] Field of Search ...... 260/88.2, 94.9 D; 252/458, 252/465

[56] References Cited
UNITED STATES PATENTS

| | | | |
|---|---|---|---|
| 2,825,721 | 3/1958 | Hogan................................ | 260/88.1 |
| 3,050,514 | 8/1962 | Cawthon............................ | 260/94.9 |
| 3,639,378 | 2/1972 | Long.................................. | 260/93.7 |

Primary Examiner—Edward J. Smith
Attorney, Agent, or Firm—Johnston, Root, Keil, Thompson and Shurtleff

[57] ABSTRACT

A process for the polymerization of ethylene or mixtures of ethylene and propene and/or butene-1 by means of a low-pressure catalyst which has been prepared by heating a carrier material in an oxygen-containing stream of gas to high temperatures, which carrier material contains silica and alumina and is impregnated with a chromium compound. The catalyst has been exhaustively extracted with water after its manufacture and then dried and reheated to high temperatures in an oxygen-containing stream of gas. High yields of polymer showing a particularly low content of chromium are obtained.

6 Claims, No Drawings

HOMOPOLYMERIZATION OR COPOLYMERIZATION OF ETHYLENE

This invention relates to a process for the polymerization of ethylene and mixtures thereof with up to 50 percent and preferably up to 20 percent by weight of propene and/or butene-1 with the aid of a low-pressure catalyst which has been prepared by heating a carrier material containing silica and alumina and impregnated with a chromium compound to temperatures above 300°C in an oxygen-containing stream of gas.

Low-pressure polymerization of ethylene using a chromium-containing or chromic acid-containing catalyst supported, usually, on silica and/or alumina in various proportions is known. This polymerization may be effected in solution, in suspension, in the molten phase or, to particular advantage, from the gas phase to form dry polymer directly (gas-phase polymerization).

In the last-named process, a catalyst efficiency of from about 10,000 to 30,000 parts of polymer per part of catalyst may be achieved. The purity of the polymer thus obtained, which contains approximately 1 to 2 ppm of chromium when the chromium content of the catalyst has the usual value of from about 2 to 3 percent by weight, is adequate for many industrial purposes. However, this value does not satisfy the requirements placed on foodstuffs packaging films. In this case, the chromium content should be much less than 1 ppm. Due to the high space-time yields required, large industrial plants usually operate at catalyst efficiencies of as low as from about 5,000 to 8,000 parts of polymer per part of catalyst, and the said requirement of very low residual chromium content cannot therefore be met, not even approximately.

It is thus an object of the invention to provide a process for the polymerization of ethylene which makes it possible to manufacture polymers having a sufficiently low chromium content, whilst achieving the high space-time yields required in industry.

We have found a process for the polymerization of ethylene and mixtures thereof with up to 50 percent and preferably up to 20 percent by weight of propene and/or butene-1 with the aid of a low-pressure catalyst which has been prepared by heating a substrate material containing silica and alumina and impregnated with a chromium compound to temperatures above 300°C in an oxygen-containing stream of gas, which process is characterized in that the catalyst used is one which, after its manufacture, has been exhaustively extracted with water and then dried and reheated in an oxygen-containing stream of gas to temperatures between 250°C and 400°C.

The exhaustive extraction with water removes from 90 to 95 percent by weight of the chromium initially contained in the catalyst. However, extraction cannot be forced beyond this point, as the residual chromium content is insoluble in water. Following drying and reactivation of the extracted catalyst by heating in an oxygen-containing stream of gas to temperatures of between 250° and 400°C and preferably between 300° and 350°C, the polymerization activity per unit weight of the total catalyst (including the support) is surprisingly virtually unchanged, even though the chromium content is now only about one tenth to one twentieth of its original value. If reactivation is carried out at temperatures below 250°C, the catalyst shows only a slight degree of activity or complete absence of activity. If heated to temperatures above 400°C it also loses activity.

The properties of the resulting polymer do not differ from those of the products prepared using conventional chromium containing catalysts. In particular, the mean molecular weights are unchanged.

As is the case when using conventional catalysts, the initial purity of the monomers is an important consideration. Suitable pretreatment of the monomer is, for example, the purifying technique described in German Pat. No. 1,183,491, in which the monomer or monomer mixture is passed over, say, alumina at elevated temperature (approx. 100° to 140°C). Indeed, the entire polymerization technique need show no differences from the processes involving the use of conventional chromium containing catalysts. Thus for example, the problem of the removal of heat of polymerization may be solved according to German Pat. Nos. 1,013,870 and 1,071,338. The temperature and pressure conditions are also those usually employed, namely from 70° to 180°C in the pressure range 4 to 100 atmospheres, preferably from 90° to 150°C in the pressure range 20 to 50 atmospheres. The choice of conditions is primarily determined by the polymerization technique used. When polymerizing from the gas phase, for example, the temperatures usually employed are from 105° to 125°C.

Propene and butene-1, when mixed with the ethylene in proportions of up to 50 percent by weight, form polymerized units in the copolymer in amounts of up to about 10 percent by weight.

Reactivation of the catalyst may be effected in the same manner as the initial conventional activation in a stream of oxygen. The oxygen may be diluted with an inert gas or gases, such as nitrogen.

The preferred carrier material is silicon dioxide and aluminum oxide or mixtures thereof. Other inorganic carriers having adequate surface area are also suitable, provided they contain silicon dioxide and aluminum oxide in addition to chromium oxide. If desired, the catalyst may also contain other metals. The precatalyst is prepared by impregnating the carrier preferably with an aqueous chromium salt solution, although it is sufficient to form an intimate mixture of the carrier with a solid chromium compound such as chromic acid by, for example, mechanical methods.

The catalyst of the invention is suitable both for polymerization in solution, where for example cyclohexane is used as solvent for the resulting polymer, as proposed for example in the process described in German Pat. No. 1,051,004, and for suspension polymerization, where for example n-pentene is the preferred continuous phase used. The present catalyst may also be used to advantage in polymerizations carried out in the molten phase, as described for example in German Pat. No. 1,247,657, However, it is preferred in polymerizations from the gas phase, this technique being described for example in German Pat. No. 1,071,338.

The following Examples reveal the important features of the process of the invention as compared with polymerization of ethylene using conventional chromium-containing catalyst. In the Examples, the parts and percentages are by weight. Under both batchwise and continuous operating conditions the chromium content of the polymer produced using the catalyst of the invention is reduced to a fraction (usually about one twentieth) of the value obtained when using the conventional catalyst. The reduction of the chromium content of the polymer to 0.5 ppm under continuous operating conditions using the conventional catalyst would require an average residence time of about 15 hours. Such long residence times are unsuitable for industrial processes, however.

EXAMPLE 1

A catalyst carrier consisting of approximately 85 percent of silica and about 15 percent of alumina is impregnated with an aqueous chromic acid solution so that the chromium content of the dried precatalyst is about 2.5 percent. This precatalyst is then heated for about 4 hours in a stream of oxygen to a temperature of about 400°C and then for a further 2 hours to about 550°C in a rigorously predried stream of oxygen. After cooling under oxygen to about 150°C, the activated catalyst is purged with dried pure nitrogen in a storage container. There is thus obtained a conventional catalyst for ethylene polymerization.

In a comparative experiment carried out according to the prior art, purified ethylene is polymerized batchwise from the gas phase using this catalyst. In this process 20 parts of a polyethylene powder are mixed, after heating at 80°C for a brief period under inert gas, with 0.1 part of the above catalyst in a reactor equipped with a stirrer of the kind described in German Pat. No. 1,218,265 and provided with external cooling. The reactor is then heated to 110°C and charged with ethylene under a pressure of 35 atmospheres. As polymerization proceeds, the pressure is maintained by repeated introduction of fresh ethylene.

After a period of three hours there are obtained 390 parts of polymer having an intrinsic viscosity of 4.5 dl/g and a chromium content of 6.4 ppm.

Using the same conditions except for the removal of the heat of polymerization, which is effected by the method proposed in German Pat. No. 1,013,870, the polymerization is carried out continuously using 0.1 part of catalyst per hour and an average residence time of the catalyst in the polymerization reactor of about 4 hours. The average yield is about 1,800 parts of polymer per hour having an intrinsic viscosity, on the average, of 4.5 dl/g and a chromium content of 1.4 ppm.

A portion of the above described activated catalyst is extracted with boiling water in a soxhlet apparatus. Extraction is continued for about 6 hours, after which the residue has a chromium content of only 0.12 percent after drying and reactivation. In contrast to the catalyst activated in the normal manner, which has a deep orange-brown color, this catalyst has only a pale lemon-yellow color.

Reactivation is carried out in a rigorously dried stream of oxygen for a period of 5 hours at 320°C.

Under both batchwise and continuous gas-phase polymerization conditions, this catalyst shows virtually the same behavior as the conventional catalyst described in the comparative Example, except for the chromium content of the polymer obtained. Thus, in the batchwise experiment carried out under the conditions specified above and using 0.1 part of the extracted and reactivated catalyst of the invention, 380 parts of polymer are obtained after 3 hours. The polymer has an intrinsic viscosity of 4.3 dl/g and contains 0.32 ppm of chromium.

In the continuous test carried out under the conditions stated at an hourly dose of 0.1 part of the catalyst of the invention and a residence time thereof in the reactor of about 4 hours, there are obtained from about 1,600 to 1,800 parts of polymer per hour, this having an average intrinsic viscosity of about 4.5 dl/g and a chromium content of 0.07 ppm.

EXAMPLE 2

In two parallel tests using the conventional catalyst described in Example 1 and the catalyst of the invention as described in Example 1, ethylene polymerizations are carried out in the presence of solvents, the polymer being produced in solution.

In these tests, a stirred autoclave provided with external cooling is filled with 250 parts of cyclohexane and, after purging with nitrogen, with 0.25 part of catalyst. The autoclave is heated to 150°C and then filled with purified ethylene until the pressure is 35 atmospheres. The pressure drops when polymerization begins. When the pressure has fallen to about 25 atmospheres it is made up to 35 atmospheres with fresh ethylene, this process being repeated as necessary. After 90 minutes polymerization is stopped. The yields of polyethylene after separation of the solvent and drying are: 180 parts using the conventional, non-extracted catalyst as described in Example 1 and 172 parts using the catalyst of the invention.

The intrinsic viscosities of the polyethylenes were 1.9 and 2.1 dl/g respectively. The densities were found to be greater than 0.962 g/cm$^3$ in each case, this being evidence of typical linear polyethylene. The sample prepared using the catalyst of the invention has a chromium content of 1.7 ppm, whereas that of the comparative sample prepared using the conventional catalyst is 35 ppm.

EXAMPLE 3

Two comparative tests are carried out in the presence of n-pentene in a manner similar to that described in Example 2, the resulting polyethylene being produced in the form of a fine suspension.

To the autoclave described in Example 2 there are charged 200 parts of n-pentene and 0.25 part of a catalyst of the invention or the comparative catalyst in each test. In each case, polymerization is continued for 90 minutes at a temperature of about 90°C and a pressure which fluctuates between 25 and 35 atmospheres of ethylene replenished as necessary. After the pentane has been separated and the product dried, there are obtained 310 parts of polyethylene using the catalyst of the invention; its intrinsic viscosity is 5.2 dl/g and its chromium content is 1.0 ppm. In the comparative test using the conventional catalyst there are obtained 350 parts of polyethylene having an intrinsic viscosity of 5.3 dl/g and a chromium content of 18 ppm.

EXAMPLE 4

Using the two catalysts prepared in the manner described in Example 1, ethylene and propylene are copolymerized in the gas phase in comparative tests.

In these tests the reactors are prepared as described in Example 1 and 0.1 part of catalyst of the invention or conventional catalyst therein. At a reaction temperature of about 95°C, the presence in the reactor is maintained at from 25 to 35 atmospheres by replenishing with a purified gas mixture of 90 parts by volume of ethylene and 10 parts by volume of propylene.

After a period of 3 hours, the yield obtained using the catalyst of the invention is 370 parts and that obtained using the comparative catalyst is 345 parts of polymer. Both polymers show an intrinsic viscosity of 4.0 dl/g and a density after annealing for 2 hours at 120°C of 0.935 g/cm$^3$. The chromium content of the polymer prepared using the catalyst of the invention is 0.3 ppm and that of the polymer prepared using the comparative catalyst is 7.3 ppm.

EXAMPLE 5

Ethylene and butene-1 are copolymerized in the gas phase in two comparative tests carried out in the manner described in Example 4. A purified gas mixture of 90 parts by volume of ethylene and 10 parts by volume of butene-1 is used under the conditions described in Example 4. The yield of polymer prepared using the catalyst of the invention is 420 parts and that of the polymer prepared using the comparative catalyst is 400 parts. In the former case the intrinsic viscosity of the polymer is 3.0 dl/g and its density is 0.940 g/cm$^3$ and in the latter case the intrinsic viscosity is 3.2 dl/g and the density 0.942 g/cm$^3$.

The chromium contents of the copolymers produced are 0.3 ppm when the catalyst of the invention is used and 6.3 ppm when the comparative catalyst is employed.

EXAMPLE 6

A reactor equipped with stirrer and external cooling is charged with 50 parts of a purified low molecular weight montan wax (paraffin wax). The reactor is heated to 150°C and purged with a mixture of nitrogen and ethylene. 0.30 parts of the catalyst of the invention is added and the ethylene pressure is raised to 35 atmospheres. A pressure of from 25 to 35 atmospheres is maintained for 90 minutes by replenishing with ethylene. The pressure in the reactor is reduced to atmospheric and the reactor is opened. 350 parts of a clear, molten viscous polyethylene are obtained. The intrinsic viscosity of this polymer is 2.2 dl/g, its density is 0.962 g/cm$^3$ and its chromium content is 1.0 ppm.

A polymer prepared under the same conditions but using the comparative catalyst shows the same intrinsic viscosity and density but has a chromium content of 23 ppm.

I claim:

1. In a process for the polymerization of ethylene and mixtures of ethylene and up to 50 percent by weight of propene and/or butene-1 with the aid of a low-pressure catalyst and wherein said catalyst is formed by heating a carrier material containing silica and/or alumina and impregnated with a chromium compound to temperatures above 300°C in an oxygen-containing stream of gas to activate said catalyst, the improvement which consists essentially of exhaustively extracting said activated catalyst with water to remove water soluble chromium therefrom, drying said catalyst, and thereafter reactivating said catalyst by reheating said catalyst in an oxygen-containing stream of gas to temperatures between 250° and 400°C.

2. A process as set forth in claim 1 wherein the carrier material is impregnated with a chromium compound in an amount of about from 2 to 3 percent by weight.

3. A process as set forth in claim 2 wherein from about 90 to 95 percent by weight of the chromium initially contained in the catalyst is removed by extraction with water.

4. A process as set forth in claim 3 wherein the carrier material is impregnated with about 2.5 percent by weight of a chromium compound.

5. A process as set forth in claim 1 wherein a homopolymer of ethylene is produced.

6. A catalyst for use in the polymerization process claimed in claim 1 which has been prepared in the manner described in claim 1.

* * * * *

UNITED STATES PATENT OFFICE
CERTIFICATE OF CORRECTION

Patent No. 3,870,693  Dated March 11, 1975

Inventor(s) Karl Wisseroth

It is certified that error appears in the above-identified patent and that said Letters Patent are hereby corrected as shown below:

In the Heading, insert--[30] February 2, 1971  Germany P 21 04 656.0--

In the Heading, insert--[73] Assignee: -- Badische Anilin- & Soda-Fabrik Aktiengesellschaft, Ludwigshafen/Rhein, Germany --

Signed and Sealed this

Twenty-eighth Day of September 1976

[SEAL]

Attest:

RUTH C. MASON
Attesting Officer

C. MARSHALL DANN
Commissioner of Patents and Trademarks